United States Patent [19]
Deschepper et al.

[11] Patent Number: 6,094,700
[45] Date of Patent: Jul. 25, 2000

[54] SERIAL BUS SYSTEM FOR SENDING MULTIPLE FRAMES OF UNIQUE DATA

[75] Inventors: Todd Deschepper; David J. DeLisle, both of Spring, Tex.; Russ Wunderlich, Turnwater, Wash.

[73] Assignee: Compaq Computer Corporation, Houston, Tex.

[21] Appl. No.: 09/042,333

[22] Filed: Mar. 13, 1998

[51] Int. Cl.[7] .................................................. G06F 13/00
[52] U.S. Cl. ............................................. 710/129; 710/30
[58] Field of Search ............................... 710/30, 52, 129, 710/131, 126; 713/300, 340

[56] References Cited

U.S. PATENT DOCUMENTS

| | | | |
|---|---|---|---|
| 4,712,176 | 12/1987 | Fredericks et al. | 710/129 |
| 5,299,313 | 3/1994 | Petersen et al. | 709/234 |
| 5,434,872 | 7/1995 | Petersen et al. | 714/811 |
| 5,748,911 | 5/1998 | Maguire et al. | 395/281 |
| 5,748,923 | 5/1998 | Eitrich | 710/129 |

*Primary Examiner*—Glenn A. Auve
*Attorney, Agent, or Firm*—Conley, Rose & Tayon, P.C.; Michael F. Heim; Jonathan M. Harris

[57] ABSTRACT

A computer system includes an I/O controller and a bridge logic device which transmit status data via a serial bus. The I/O controller comprises an embedded controller, a memory device, and a serial bus interface including a transceiver, a transmit register, and a receiver register. The bridge logic also includes a serial bus interface with a transceiver, a transmit register, and a receiver register. Data is transmitted from the transmit register of one device to the receive register of the other device. Although the serial bus protocol limits data transfers to eight-bit segments, the I/O controller and bridge logic transmit up to twenty-four different variables by encoding each transmitted byte into a data frame that includes a two-bit frame identifier and a six-bit data field. Further, one of the data frames transmitted by the I/O controller includes an acknowledge bit to indicate when a previous frame has been received from the bridge logic. The bridge logic only transmits new data if the I/O controller toggles the acknowledge bit and transmits the frame containing the toggled acknowledge bit to the bridge logic. The acknowledge bit prevents the South Bridge from overwriting previously transmitted data that has not yet been read from the receive register in the I/O controller.

30 Claims, 7 Drawing Sheets

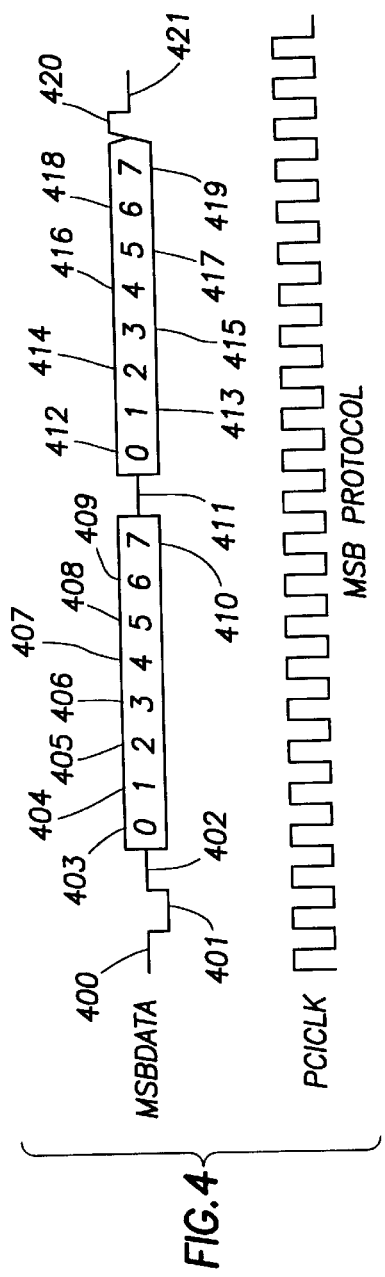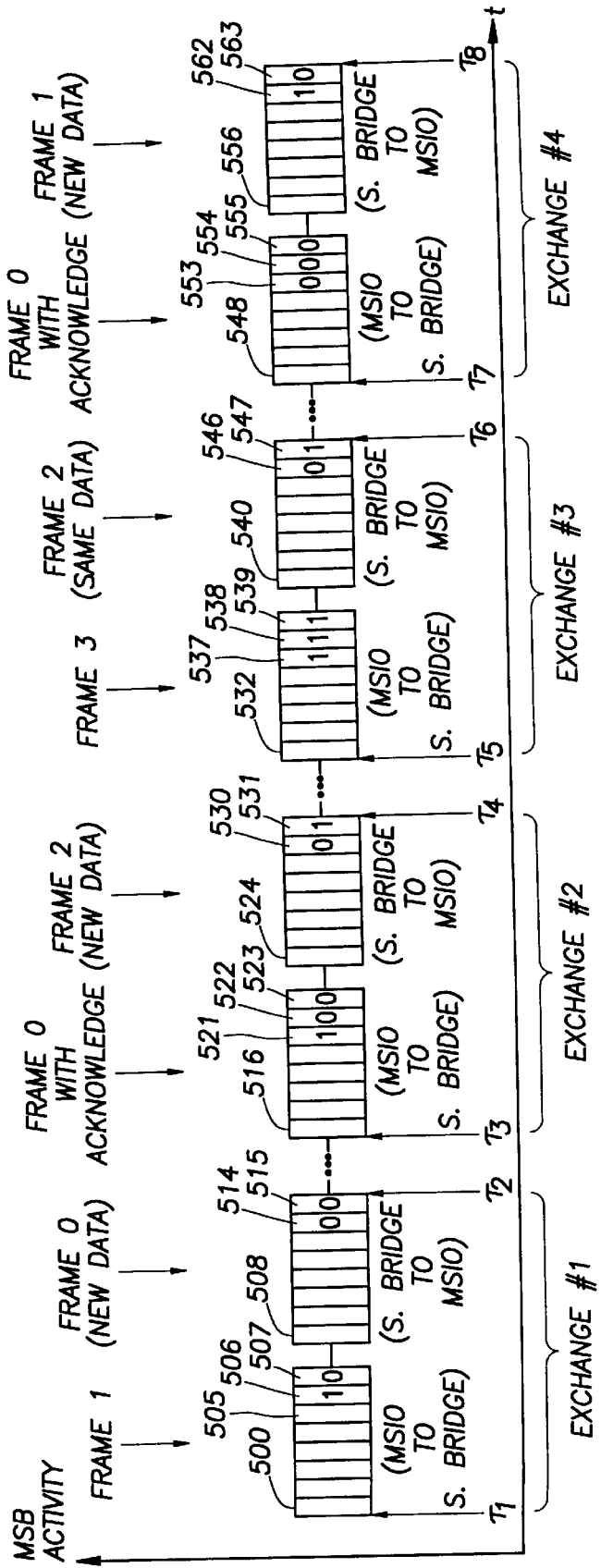

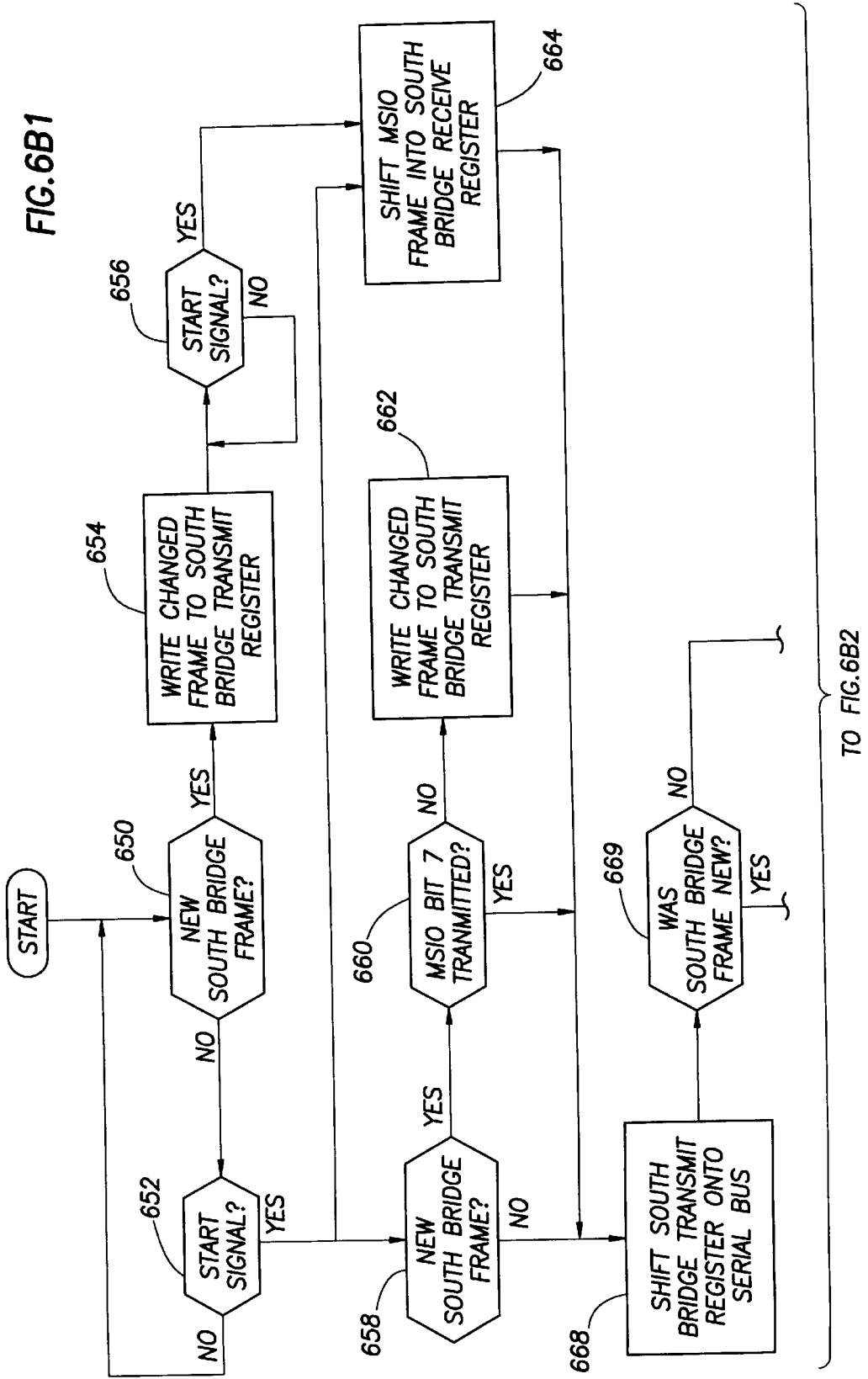
FIG.6B1

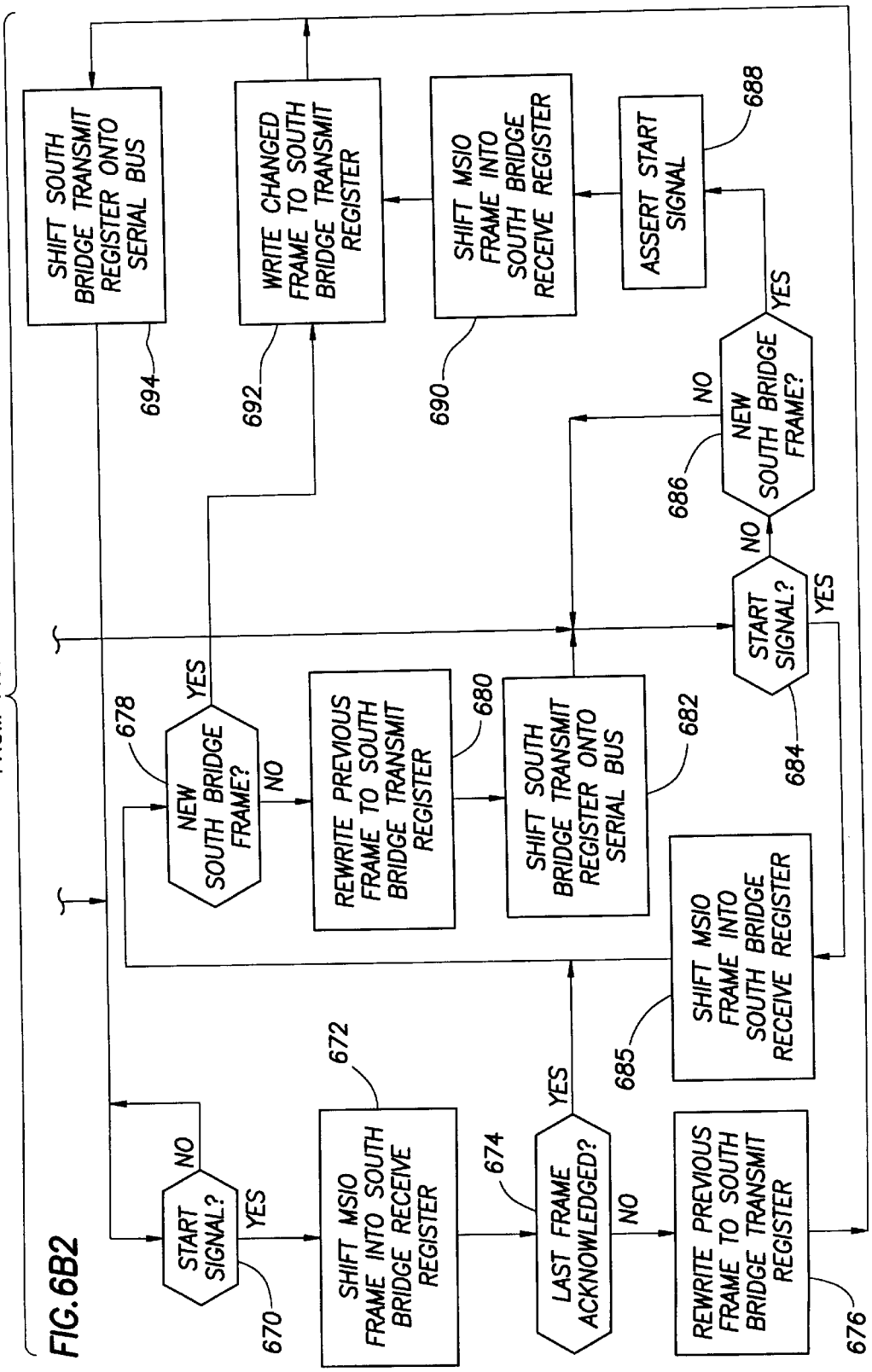

SERIAL BUS SYSTEM FOR SENDING MULTIPLE FRAMES OF UNIQUE DATA

BACKGROUND OF THE INVENTION

1. Field of the Invention

The present invention relates generally to bus architectures in personal computer systems. More particularly, the present invention relates to the manner and techniques by which components in a computer system communicate over a serial bus. Still more particularly, the invention relates to an improved technique for upgrading serial bus functionality without changing the serial bus protocol.

2. Background of the Invention

A personal computer system includes a number of modular components with specialized functions that cooperatively interact to realize the many features of modern computer systems. The ability of these various components to exchange data and other information is vital to the successful operation of a computer system. One of the critical requirements in designing a new computer system is that all system components (including those that may be added to the system by a user) must be compatible. A component is compatible if it effectively communicates and transfers data without interfering or contending with the operation of other system components. Thus, designing an improved computer system requires that any features added to existing components conform to the data transfer protocols of the previous design.

As an example, some of the early computer systems included a processor (or CPU), random access memory (RAM), and certain peripheral devices such as a floppy drive, a keyboard and a display. These components typically were coupled together using a network of address, data and control lines, commonly referred to as a "bus." As computer technology evolved, it became common to connect additional peripheral devices to the computer through ports (such as a parallel port or a serial port), or by including the peripheral device on the main system circuit board (or "motherboard") and connecting it to the system bus. One early bus that still is in use today is the Industry Standard Architecture (ISA) bus. The ISA bus, as the name implies, was a bus standard adopted by computer manufacturers to permit the manufacturers of peripheral devices to design devices that would be compatible with most computer systems. The ISA bus includes 16 data lines and 24 address lines and operates at a clock speed of 8 MHz. A large number of peripheral components have been developed over the years to operate with the ISA protocol.

The components which connect to a given bus receive data from the other components on the same bus via the bus signal lines. Selected components may operate as "bus masters" to initiate data transfers over the bus. Each component on the bus circuit operates according to a protocol associated with that bus which defines the purpose of each bus signal and regulates such parameters as bus speed and arbitration between components requesting bus mastership. A bus protocol also determines the proper sequence of bus signals for transferring data over the bus. As computer systems have continued to evolve, new bus circuits offering heightened functionality have replaced older bus circuits, allowing existing components to transfer data more effectively.

One way in which the system bus has been made more effective is to permit data to be exchanged in a computer system without the assistance of the CPU. To implement this design, a new bus architecture called Extended Industrial Standard Architecture (EISA) was developed. The EISA bus protocol permits system components residing on the EISA bus to obtain mastership of the bus and to run cycles on the bus independently of the CPU. Another bus that has become increasingly popular is the Peripheral Component Interconnect (PCI) bus. Like the EISA bus, the PCI bus provides bus master capabilities to devices connected to the PCI bus. The PCI bus also operates at clock speeds of 33 MHz or faster. Current designs contemplate implementing a 100 MHz PCI bus.

To ensure that existing components continue to remain compatible with future generations of computer systems, new computer designs often include many different types of buses. Because different buses operate according to different protocols, the computer design uses bridge devices to interface, or bridge, the different buses. Such a scheme permits components coupled to one bus to exchange data with components coupled to another bus.

For example, FIG. 1 illustrates a representative prior art computer system that includes a CPU coupled to a bridge logic device via a CPU bus. The bridge logic device is sometimes referred to as a "North bridge" for no other reason than it often is depicted at the upper end of a computer system drawing. The North bridge also couples to the main memory array by a memory bus. The North bridge couples the CPU and memory to the peripheral devices in the system through a PCI bus or other expansion bus (such as an EISA bus). Various components that understand PCI protocol may reside on the PCI bus, such as a graphics controller.

If other secondary expansion buses are provided in the computer system, another bridge logic device typically is used to couple the PCI bus to that expansion bus. This bridge logic is sometimes referred to as a "South bridge" reflecting its location vis-a-vis the North bridge in a typical computer system drawing. An example of such bridge logic is described in U.S. Pat. No. 5,634,073, assigned to Compaq Computer Corporation. In FIG. 1, the South bridge couples the PCI bus to an ISA bus. Various ISA-compatible devices are shown coupled to the ISA bus.

The South bridge may also support an input/output (I/O) controller that interfaces to basic input/output devices such as a keyboard, a mouse, a floppy disk drive, and various input switches such as a power switch and a suspend switch. The I/O controller typically couples to the South bridge via a standard bus, shown as an ISA bus in FIG. 1. A serial bus, which generally is a bus with only one data signal, may provide an additional connection between the I/O controller and South bridge. The I/O controller typically comprises an ISA bus interface (not specifically shown) and transmit and receive registers (not specifically shown) for exchanging data with the South bridge over the serial bus. The I/O controller generally has the capability to handle power management functions such as reducing or terminating power to components such as the floppy drive, blocking the clock signals that drive components such as the bridge devices and CPU, and inducing sleep mode in the peripheral buses. The I/O controller further asserts System Management Interrupt (SMI) signals to various devices such as the CPU and North bridge to indicate special conditions pertaining to input/output activities such as sleep mode. The I/O controller typically incorporates a counter or a Real Time Clock (RTC) to track the activities of certain components such as the hard drive and the PCI bus, inducing a sleep mode or reduced power mode after a predetermined time of inactivity. The I/O controller may also induce a low-power suspend mode if the suspend switch is pressed, in which the power is completely shut off to all devices except the I/O controller itself.

In one particular computer design, the serial bus connecting the South bridge and I/O controller comprises an eight-bit serial bus in which eight bits of data are transmitted sequentially over the bus. The data exchanged over the serial bus generally represents power management status and other configuration data. The I/O controller and South bridge each include transmit and receive registers coupled to the serial bus. The transmit register in the I/O controller holds data to be transmitted to the receive register in the South bridge, while the transmit register in the South bridge holds data to be sent to the receive register in the I/O controller. Each data bit sent by the I/O controller represents the state of a certain variable or situation, such as whether a sleep request or idle request is asserted or whether the ISA bus pins should be tristated for power-down mode. Data bits transmitted from the South bridge to the I/O controller are defined to represent similar information, such as whether the processor clock is disabled for suspend mode or whether the PCI bus is active.

If one of the status values in the I/O controller changes, the I/O controller may drive the serial bus low to request an exchange of data with the South bridge over the serial bus. The South bridge may also request an exchange of data with the I/O controller by driving the serial bus low. In response to either device driving the serial bus low, the I/O controller first transmits all eight of its status bits to the South bridge, one bit at a time. The South bridge follows by consecutively transmitting each of its eight status bits to the I/O controller. In this manner, the I/O controller and South bridge exchange a total of sixteen status values.

Recently, some computer developers have adopted the Advanced Configuration and Power Interface (ACPI) as a power management specification for new computer designs. The ACPI specification allows the computer operating system software to control the amount of power delivered to the various computer components. Because conforming to the ACPI specification requires that both the I/O controller and South bridge transmit more than eight different status bits, however, the serial bus architecture described above is not adequate to support the ACPI features. Upgrading the functionality of such a serial bus to include ACPI conformance, however, will require significant and, perhaps, costly design modifications to both the I/O controller and South bridge chip. It thus would be advantageous to transmit more than eight bits of data across the serial bus with as little design impact to the existing bus as possible.

Despite the apparent advantages of continuing to increase computer system functionality as user needs evolve, modifications to existing components can be prohibitively costly and can limit backward-compatibility. To date, no one has designed a computer system to transmit more than eight bits of information on an eight-bit serial bus.

SUMMARY OF THE INVENTION

Accordingly, the present invention discloses a computer system including a processor, a memory device, a North bridge logic coupling the processor and memory device, and a PCI expansion bus coupled to the North bridge. The expansion bus further couples to a South Bridge logic device, which interfaces to a plurality of secondary buses including a sub-ISA bus, an IDE bus, and a Universal serial bus. The computer system further includes an I/O controller that interfaces to the sub-ISA bus and also couples to the South Bridge logic via a serial bus. The I/O controller further receives input signals from various external switches such as a power button or suspend switch, a floppy disk drive, and a keyboard and tracking device.

The I/O controller comprises an embedded controller for executing firmware instructions, an ISA interface, a memory device, and a serial bus interface. The serial interface includes a transceiver capable of both driving and receiving signals from the serial bus, a transmit register coupled to the serial bus, the transceiver, and the embedded controller. The serial interface further includes a receive register coupled to the serial bus, transceiver, and the embedded controller. The transmit and receive registers comprise standard eight-bit shift registers.

The embedded controller is capable of loading data into the transmit register and reading data from the receive register. The embedded controller also executes read and write transactions with the memory device to retrieve and store variables and status bits. The transmit register asserts a signal to the transceiver indicating that the embedded controller has loaded the transmit register. In response, the transceiver asserts a start signal over the serial bus by driving the serial bus low for one cycle and then pulses a clock signal to shift the transmit register contents onto the serial bus, one bit at a time. Next, the South Bridge sequentially transmits eight bits of data over the serial bus, and the transceiver of the I/O controller pulses a clock signal to shift the serial bus data into the receive register. The receive register asserts a signal to the embedded controller after receiving the byte of data from the serial bus. In response, the embedded controller reads the receive register contents. The transceiver also uses the transmit and receive registers to send and receive data if a start signal is asserted over the serial bus by the South Bridge.

Similarly, the South Bridge logic includes a serial bus interface which comprises a transceiver, a transmit register, and a receive register. The South Bridge logic further includes an interface to a PCI bus as well as an ISA interface, an IDE interface, and a USB interface. The South Bridge logic also includes a power management engine and a PCI arbiter. The ISA interface, IDE interface, USB interface, and power management interface couple to the PCI interface, while the PCI arbiter couples directly to the PCI bus.

The power management engine is capable of loading the South Bridge transceiver with data such as power management variables and also of receiving data from the South Bridge transceiver. The South Bridge transceiver is further capable of storing a copy of each of these variables and also stores data received from the I/O controller via the serial bus. The South Bridge transceiver is capable of loading the South Bridge transmit register with data and reading the contents of the South Bridge receive register. In response to a start signal over the serial bus from the I/O controller, the South Bridge pulses a clock signal to the receive register, causing the South Bridge receive register to capture an eight-bit frame of data from the serial bus. During the next clock cycle, the transceiver reads the data frame from the South Bridge receive register and loads a data frame into the South Bridge transmit register based on the received frame. The South Bridge transceiver then pulses a clock signal to send the contents of the South Bridge transmit register over the serial bus.

Each eight-bit data frame transmitted between the I/O controller and South Bridge device includes a two-bit frame identifier (ID) and a six-bit data field. Because frame ID field identifies the meaning of the data field bits, the total number of different variables and status bits that can be transmitted from one device equals the number of frame ID bits multiplied by the number of bits in the data field. A two-bit frame ID and a six-bit data field therefore provides the I/O controller and South Bridge each as many as to twenty-four different status bits to transmit. In this manner, the devices are permitted to adhere to the existing eight-bit serial bus protocol but are allowed to transmit more than eight different bits.

Whenever the value of a status bit changes in the I/O controller, the I/O controller preferably transmits the frame containing that bit to the South Bridge. According to the serial bus protocol, the South Bridge then transmits a data frame to the I/O controller. Similarly, if a status bit changes in the South Bridge, then the South Bridge can request to transfer that data frame over the serial bus. If status bits change that are contained in more than one frame, then the South Bridge uses a round robin arbitration scheme to determine which frame to transmit. Because the embedded controller may not read the receive register contents immediately after a data transfer, however, the South Bridge is not permitted to send new data or initiate a new data transfer unless the I/O controller has acknowledged the previous data transfer. After the South Bridge transfers a data frame, the South Bridge asserts an end signal over the serial bus.

To prevent the South Bridge from overwriting data in the receiver register of the I/O controller, one of the data frames transmitted from the I/O controller to the South Bridge includes an acknowledge bit. The acknowledge bit is toggled to indicated receipt of the previous data frame transmitted by the South Bridge. When the embedded controller reads new data from the receive register which was transmitted by the South Bridge, then the I/O controller toggles the current value of the acknowledge bit and transmits the frame containing the acknowledge bit to the South Bridge. The South Bridge keeps track of the current value of the acknowledge bit and compares the value of the acknowledge bit that was transmitted with the current value. If the transmitted acknowledge bit is different from the current value, indicating acknowledgement, then the South Bridge updates the current value of the acknowledge bit and is permitted to transmit new data to the I/O controller.

If, after transmitting new data to the I/O controller, the South Bridge detects that the I/O controller is asserting the start signal to initiate a new data transfer over the serial bus, the South Bridge must first receive an entire data frame before determining the state of the acknowledge bit. If the I/O controller transmits a frame other than the frame containing the acknowledge bit, then the South Bridge retransmits the same data that was previously transmitted to the I/O controller. Similarly, if the I/O controller transmits the frame containing the acknowledge bit but the transmitted acknowledge bit has the same value as the current acknowledge bit value, then the South Bridge again transmits the previously transmitted data frame. If the I/O controller transmits a toggled acknowledge bit, however, the South Bridge may respond by transmitting new data over the serial bus. Because the South Bridge must determine whether the I/O controller data frame contained a toggled acknowledge bit before choosing which frame to transfer in response, the new data transmitted by the South Bridge is essentially determined by the data received from the I/O controller.

Thus, the present invention comprises a combination of features and advantages that enable it to substantially advance the art by providing an I/O controller and South Bridge that transmit data frames over the eight-bit serial bus, including acknowledge bits to prevent the South Bridge from overwriting data previously transmitted to the I/O controller. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which:

FIG. 4 is a timing diagram illustrating the data transfer protocol for the serial bus of FIG. 3;

FIG. 5 is a timing diagram illustrating a sequence of data frames transmitted between the I/O controller and South bridge according to the protocol of FIG. 4;

FIGS. 6B1 and 6B2 are an exemplary flowchart illustrating the use of the serial bus by the South bridge of FIG. 3.

The following detailed description describes the preferred embodiment for implementing the underlying principles of the present invention. One skilled in the art should understand, however, that the following description is meant to be illustrative of the present invention, and should not be construed as limiting the principles discussed herein. In addition, certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF PREFERRED EMBODIMENTS

Figure 2:
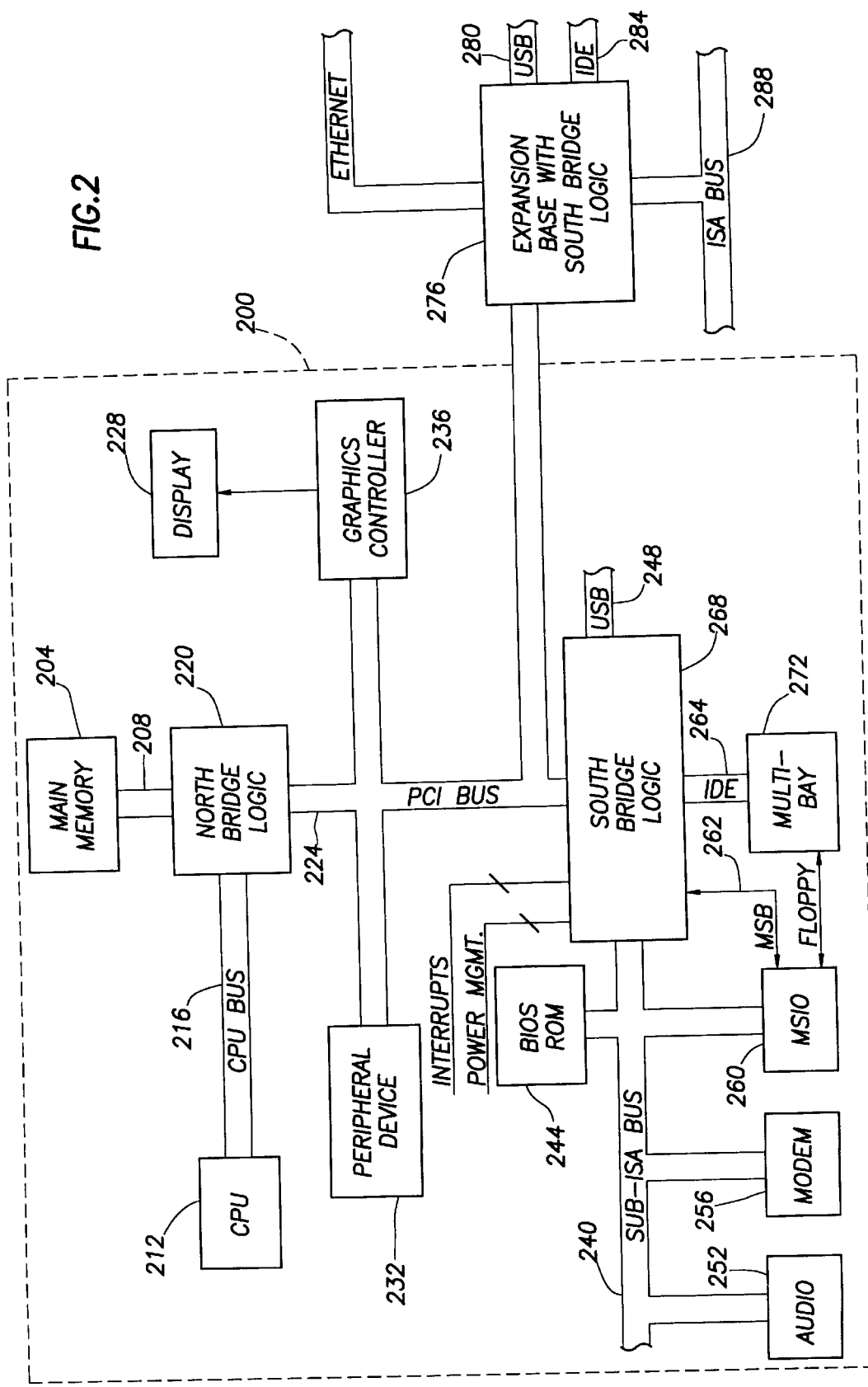
FIG. 2 is a block diagram of a portable computer system constructed in accordance with the preferred embodiment of the present invention with a bridge logic device and I/O controller coupled by a serial bus.

Referring now to FIG. 2, a computer system 200 constructed in accordance with the preferred embodiment generally includes a processor or CPU 212 coupled to a main memory array 204 and a variety of other peripheral computer system components through an integrated bridge logic device 220. As depicted in FIG. 2, the bridge logic 220 sometimes is referred to as a "North bridge." The CPU 212 preferably couples to bridge logic 220 via a CPU bus 216, or the bridge logic 220 may be integrated into the CPU 212. The CPU 212 may comprise, for example, a Pentium® II microprocessor. It should be understood, however, that computer system 200 could include other alternative types of microprocessors. Further, an embodiment of computer system 200 may include multiple processors, with each processor coupled through the CPU bus 216 to the bridge logic unit 220.

The main memory array 204 preferably couples to the bridge logic unit 220 through a memory bus 208, and the bridge logic 220 preferably includes a memory control unit (not shown) that controls transactions to the main memory 204 by asserting the necessary control signals during memory accesses. The main memory 204 functions as the working memory for the CPU 212 and generally includes a conventional memory device or array of memory devices in which program instructions and data are stored. The main memory array may comprise any suitable type of memory such as dynamic random access memory ("DRAM") or any of the various types of DRAM devices such as synchronous dynamic random access memory ("SDRAM"), extended data output dynamic random access memory ("EDO DRAM"), or Rambus™ dynamic random access memory ("RDRAM").

The computer system 200 also preferably includes a graphics controller 236 that couples to the bridge logic 220 via an expansion bus 224 as shown in FIG. 2 the expansion bus 224 comprises a Peripheral Component Interconnect ("PCI") bus. Alternatively, the graphics controller 236 may couple to bridge logic 220 through an additional Advanced Graphics Port ("AGP") bus (not specifically shown). As one skilled in the art will understand, the graphics controller 236 controls the rendering of text and images on a display device 228. The graphics controller 236 may embody a typical graphics accelerator generally known in the art to render three-dimensional data structures on display 228. These data structures can be effectively shifted into and out of main memory 204 via the expansion bus and bridge logic 220. The graphics controller 236 therefore may be a master of the expansion bus (including either PCI or AGP bus) enabling the graphics controller 236 to request and receive access to a target interface within the bridge logic unit 220, including the memory control unit. This mastership capability permits the graphics controller 236 to access main memory 204 without the assistance of the CPIJ 212. A dedicated graphics bus accommodates rapid retrieval of data from main memory 204. As will be apparent to one skilled in the art, the bridge logic 220 includes a PCI interface to permit master cycles to be initiated and received by bridge logic 220. If an AGP bus is included in the system, the bridge logic 220 also includes an interface for initiating and receiving cycles to and from components on the AGP bus. The display 228 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

In the preferred embodiment as shown in FIG. 2, the expansion bus 224 comprises a Peripheral Component Interconnect (PCI) bus. The present invention, however, is not limited to any particular type of expansion bus, and thus various buses may be used, including a high speed (66 MHz or faster) PCI bus. In the preferred embodiment, a plurality of PCI peripheral devices may reside on the PCI bus 224. The PCI devices may include any of a variety of peripheral devices such as, for example, network interface cards (NIC's), video accelerators, audio cards, hard or floppy disk drives, PCMCIA drives, Small Computer Systems Inter-face ("SCSI") adapters and telephony cards. Although only one PCI peripheral device 232 is depicted in FIG. 2, it should be recognized that computer system 200 may include any number of PCI devices as desired.

The following discussion describes the preferred embodiment of computer system 200 for a laptop computer that can be connected to an expansion base 276 via the PCI bus 224. This should not be construed as limiting the present invention to a laptop. The present invention also may be used with a desktop system, work station, server, or handheld computer. In addition and as mentioned above, computer system 200 can be implemented with respect to the particular bus architectures shown in FIG. 2 (i.e., PCI bus), or other bus architectures, as desired. The embodiment described herein, however, assumes bus 224 represents a PCI bus, as shown in FIG. 2, and thus the following discussion will focus on configuring the present invention for that embodiment. Further, CPU 212 preferably comprises a Pentium® II processor and thus CPU bus 216 represents a Pentium® II bus. These bus protocols and the terminology used with respect to these protocols are well known to those of ordinary skill in the art. If a more thorough understanding of the PCI, or Pentium® II bus is desired, reference should be made to the PCI Local Bus Specification (1993) and Intel P6 External Bus Specification. If an AGP bus also is used in the computer system, reference may be made to the Accelerated Graphics Port Interface Specification (Intel, 1996).

Referring still to FIG. 2, another bridge logic device 268 also preferably connects to expansion bus 224. This bridge logic device 268 (which sometimes is referred to as a "South bridge") couples or "bridges" the primary expansion bus 224 to other secondary expansion buses. These other secondary expansion buses may include an ISA (Industry Standard Architecture) bus, a sub-ISA bus, a USB (Universal Serial Bus), an IDE bus, an IEEE 1394 standard (or "fire wire") bus, or any of a variety of other buses that are available or may become available in the future. In the preferred embodiment of FIG. 2, the South bridge logic 268 couples to a sub-ISA bus 240, a USB bus 248 and an IDE bus 264. As will be apparent to one skilled in this art, various peripheral devices may be coupled to each of these buses. Thus, as shown in the preferred embodiment of FIG. 2, an MSIO (Mobile Super I/O) controller chip 260 connects to the sub-ISA bus 240, as does an audio card 252, modem 256, and BIOS ROM 244. Similarly, according to the preferred embodiment, a multi-bay configuration 272 couples to the IDE bus 264 and to the MSIO 260. The multi-bay configuration preferably includes three independent bays connected in any master/slave, primary/secondary configuration supporting hot-plugging of IDE devices in the bays. As one skilled in the art will understand, various IDE devices are available including CD ROM drives, floppy drives, tape drives, and the like. The USB 248 supports various peripherals, especially video peripherals such as video cameras for teleconferencing purposes. In addition to the buses discussed above, the South bridge 268 also preferably connects to interrupt signal lines, power management signal lines, and an MSB (MSIO Serial Bus) 262.

As noted above, the computer system 200 preferably comprises a laptop computer. To facilitate use of the computer system 200 within a traditional desktop environment, an expansion base 276 preferably is available for connecting the laptop computer system to additional peripheral devices and to a computer network via an Ethernet bus. The expansion base 276 may include any type of configuration, including a port replicator or docking station. The present invention envisions, however, that the expansion base 276 also includes a South bridge logic (not shown specifically) for coupling components on the PCI bus 224 to other components coupled to the expansion base. Thus, as shown in FIG. 2, a South bridge logic device within the expansion base 276 couples the PCI bus to various expansion buses including an ISA bus 288, USB 280 and IDE bus 284. The following discussion focuses on the MSB interface between the South bridge logic 268 and MSIO 260. This same architecture may be used (with some minor modifications), if desired, for the South bridge logic within the expansion base 276.

Figure 3:
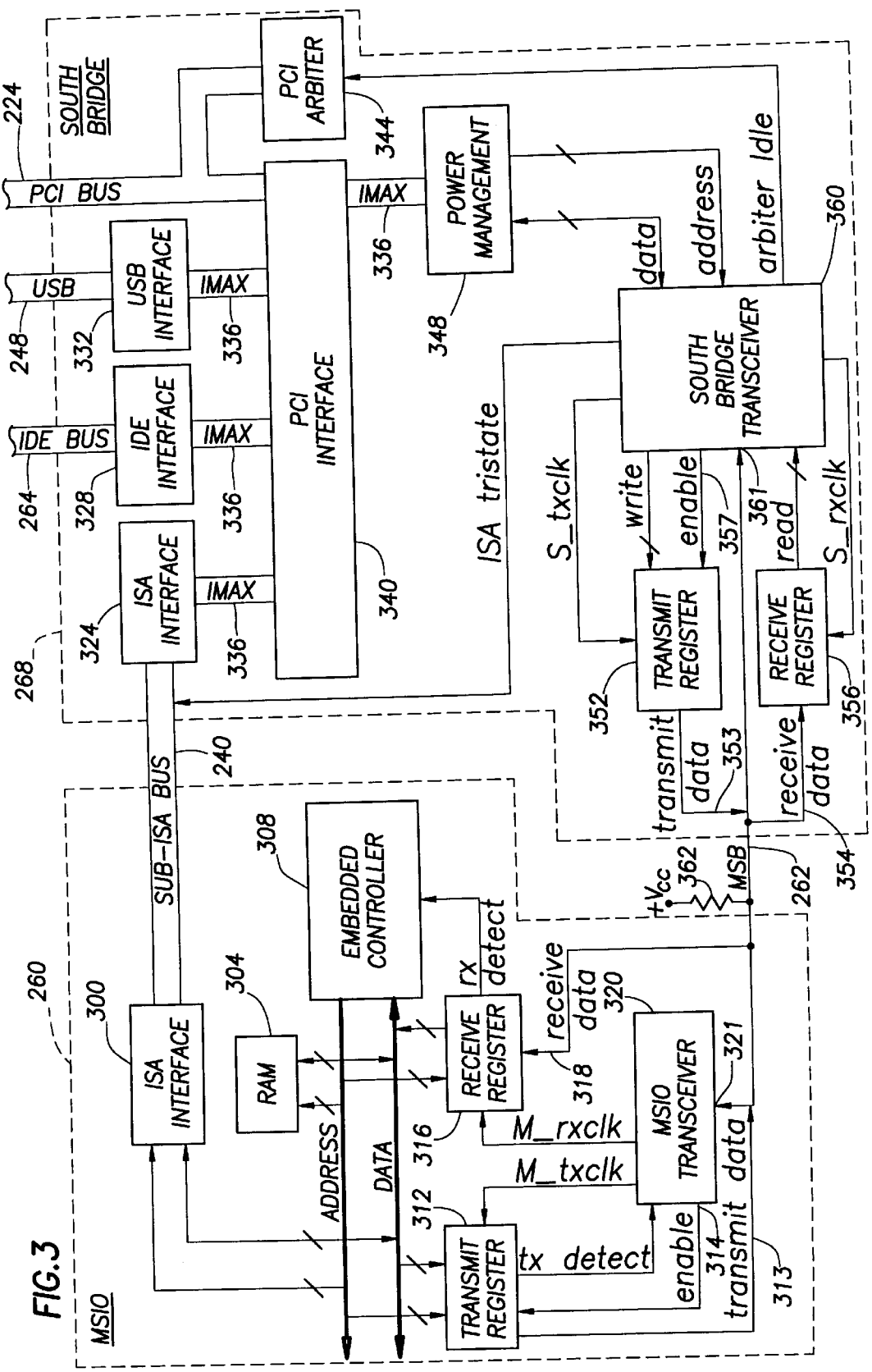
FIG. 3 is a block diagram of the I/O controller, bridge logic device, and serial bus of FIG. 2.

FIG. 3 illustrates South bridge 268 coupled to MSIO 260 via the sub-ISA bus 240 and MSIO Serial Bus (MSB) 262. The MSIO generally comprises an ISA interface 300, a random access memory (RAM) 304, an embedded controller 308, a transmit register 312, a receive register 316, and a transceiver 320. The ISA interface 300 couples to the ISA bus 240 and also to ADDRESS and DATA signals from the embedded controller 308. The random access memory (RAM) 304, transmit register 312, and receive register 316 also couple to the ADDRESS and DATA signals. The receive register 316 further receives a receive data signal 318 from the serial bus 262 and asserts a receive detect signal to the embedded controller 308. The transmit register 312 provides a transmit data signal 313 to the serial bus 262 and a transmit detect signal to the transceiver 320. The transceiver 320 asserts the M_txclk signal and enable signal 314 to the transmit register 312 and an M_rxclk signal to the receive register 316. The transceiver 320 is further configured to drive and monitor the serial bus 262 via input/output pin 321.

The MSIO 260 may also couple to various input/output devices (not shown) such as a power switch, a suspend switch, a keyboard, a mouse, and a floppy drive. Accordingly, the MSIO includes well-known circuitry to process these signals, such as a keyboard matrix to decode which key was pressed. The MSIO 260 may run cycles on the ISA bus 240 to the South bridge 264 or CPU 212 for further processing of the data related to these input/output devices.

The embedded controller 308 preferably comprises a microprocessor or microcontroller capable of running firmware instructions to control the general operation of the MSIO 260. In accordance with the preferred embodiment, embedded controller 308 comprises an 8051 microcontroller manufactured by Intel Corp. The embedded controller 308 asserts the ADDRESS signals to read data from and write data to the various devices within the MSIO 260 via the DATA lines. For instance, to write data to the transmit register 312 for subsequent transmission over the serial bus 262, the embedded controller 308 generates address signals corresponding to the transmit register 312. Upon receiving that particular address, the transmit register 312 accepts the data from the embedded controller 308 via the DATA lines. Likewise, the embedded controller 308 reads data from the receive register 316 by asserting address signals corresponding to the receive register 316. Upon receiving the proper address, the contents of the receive register 316 are written to the DATA lines. The embedded controller 308 also uses the ADDRESS and DATA signals to conduct data read and data write transactions with the RAM 304 and to run cycles on the sub-ISA bus 240 via the ISA interface.

The embedded controller 308 receives a receive detect signal from the receive register 316. The receive detect signal may be an interrupt or any direct input signal to the embedded controller 308 to indicate that new data has been placed into the receive register 316 via the serial bus 262. Although not specifically shown in FIG. 3, the embedded controller 308 preferably asserts interrupt signals to other devices within the computer system to indicate powerdown modes or in response to signals from the input/output devices described above. In particular, the embedded controller 308 transmits System Management Interrupt (SMI) signals via the sub-ISA bus 240. The embedded controller 308 further provides enable signals (not shown) to enable or disable clocks that provide timing signals to devices including the CPU 212 and the North bridge 220. By disabling these clock signals, the embedded controller 308 effectively has the capability to place the computer system into powerdown mode.

The random access memory (RAM) 304 holds instructions (i.e., firmware) and data for the embedded controller 308. The firmware may be loaded into RAM 304 at startup via a standard Flash ROM (not shown). Alternatively, the embedded controller 308 may execute firmware instructions from memory internal to the embedded controller. Although FIG. 3 illustrates RAM 304 connected to the common ADDRESS and DATA signals, RAM 304 may couple to embedded controller 308 via a separate memory bus in an alternative embodiment. In other embodiments, RAM 304 may be internal to the embedded controller 308. Data stored within RAM 304 includes power management variables and Advanced Configuration and Power Interface (ACPI) data. Selected variables, including ACPI and other power management variables, may be transmitted to or received from the South bridge 268 via the serial bus 262. These variables will be addressed in more detail with respect to the description of the South bridge 268, below.

The transmit and receive registers 312 and 316 are standard eight-bit (i.e., one-byte) shift registers. A shift register generally comprises one or more storage elements (or bits) and which are coupled serially (i.e., in a chain). In such a configuration, the contents of each storage element shift to the next storage element in the chain when a timing signal (such as the M_txclk or S_rxclk signal) is pulsed. Shift registers may be loaded one bit at a time by sending an input signal to the first storage element in the chain and pulsing the timing signal. In response to the timing pulse, each bit is shifted to the subsequent storage element until the register is filled. A shift register may be unloaded one bit at a time by pulsing the associated timing signal, shifting each bit forward by one storage element. The bits may be read after each clock pulse from the final storage element in the chain. Hence, a shift register essentially operates as a first-in, first out (FIFO) queue.

All of the storage elements in a shift register may also be read from or written to in a parallel fashion using standard methods that do not involve shifting. Hence, executing a parallel read of shift register contents does not affect the data contents of that register. The transmit register 312 is further adapted to assert the tx detect signal to transceiver 320 when the embedded controller 308 writes data to the transmit register 312. As will be described in more detail below, the transceiver 320 will respond to the tx detect signal by placing data from the transmit register 312 onto the MSB 262. Similarly, the receive register 316 asserts the rx detect signal to the embedded controller 308 whenever data is shifted into the receive register from the MSB 262. The embedded controller 308 then responds by reading the receive register data.

The beginning and ending bits of a binary number are generally known as the most significant bit and least significant bit, respectively. For example, the binary number 1110, which represents the decimal number 14, has a least significant bit of "0." As another example, the binary number 1000, which represents the decimal number 8, has a most significant bit of "1." To ensure that register data is not interpreted by the embedded controller 308 in reverse, it is necessary to specify which storage element in the shift registers hold the most significant or least significant bit. Accordingly, the storage element holding least significant bit of the transmit register 312 outputs to the serial bus 262, while the storage element holding most significant bit of the receive register 316 receives input from the serial bus 262. It follows that data is shifted onto the serial bus 262 from the transmit register 312 in order from the least significant bit to the most significant bit. Likewise, data is shifted into the receive register 316 from the serial bus in order from the least significant bit to the most significant bit.

The transceiver 320 pulses the M_txclk and M_rxclk signals to shift data through the transmit and receive registers 312 and 316, respectively. The M_txclk and M_rxclk signals preferably are synchronized with the PCICLK signal (not shown) which is a standard signal on the PCI bus 224. Each time transceiver 320 pulses M_txclk, the transmit register 312 shifts one bit of data onto the serial bus 262 via the transmit data 313 signal. Hence, the entire eight-bit transmit register 312 can be placed sequentially onto the serial bus 262, starting with the least significant bit, by pulsing the $M_{13}$ txclk signal eight times. Accordingly, each time the transceiver 320 pulses the M_rxclk signal, the receive register 316 accepts one bit of data from the serial bus 262 via the receive data 31 8 signal. Hence, the entire eight-bit receive register 316 may be filled with data from the South bridge 268 via the serial bus 262 by pulsing the M_rxclk signal eight times.

As will be discussed in greater detail with respect to FIG. 4, the transceiver 320 may serve as the master of the serial bus 262 via output pin 321 to initiate data transactions. When not asserting the bus 262, however, transceiver 320 preferably places output pin 321 into a tristate mode. In a tristate mode, pin 321 is neither asserted low or high but comprises a high impedance state, as is known to those of ordinary skill in the art. Transceiver 320 also asserts the enable 314 signal to place transmit register 312 into the tristate mode whenever transmit register 312 is not transmitting data.

Referring still to FIG. 3, the South bridge 268 generally comprises an ISA bus interface 324, and IDE interface 329, a USB interface 332, a PCI interface 340, a PCI arbiter 344, a power management engine 348, a transceiver 360, and transmit and receive registers 352 and 356, respectively. The transceiver 360, transmit register 352, and receive register 356 serve as an interface to the MSB 262, while the ISA interface 324 allows the South bridge to run master and target cycles on the sub-ISA bus 240. Likewise, the IDE interface 328 couples to the IDE bus 264, allowing the South bridge 268 to run IDE cycles, and the PCI interface 340 couples to the PCI bus 224, allowing the South bridge 224 to run PCI cycles. The PCI arbiter 344 also connects to the PCI bus 224 and preferably serves as the bus arbiter for all PCI bus cycles. The PCI interface 340 further couples to the ISA interface 324, IDE interface 328, USB interface 332 over an Internal Modular ASIC Expansion (IMAX) bus 336, allowing ISA, IDE, and USB devices to run PCI cycles. The IMAX bus 336 preferably comprises separate master and target buses as described in copending applications entitled "Computer System with Bridge Logic that Includes an Internal Modular Expansion Bus and a Common Target Interface for Internal Target Devices" and "Computer System with Bridge Logic that Includes an Internal Modular Expansion Bus and a Common Master Interface for Internal Master Devices."

The power management engine 348 also couples to the PCI interface 340 via the IMAX bus 336 and to the transceiver 360 via ADDRESS and DATA signals. Transceiver 360 also provides an enable 357 signal to the transmit register 352 and couples to the transmit and receive registers 352 and 356 via write and read signals, respectively. Transceiver 360 further asserts the arbiter idle signal (to the PCI arbiter 344) and asserts the ISA tristate signal (to output enable the ISA bus 240). The transmit and receive registers 352 and 356 connect to the MSB 262 via transmit data 353 and receive data 354 signals, respectively. Transceiver 360 asserts clock signals S_txclk and S_rxclk to the transmit and receive registers 352 and 356, respectively. In addition to the hardware described above, the South bridge 268 may couple to a serial interrupt bus (not specifically shown) for serial device transactions.

The power management engine 348 generally handles power management functions, including handling of the Advanced Configuration and Power Interface (ACPI) variables. The computer operating system transfers data to and from the power management engine 348 via the PCI bus 224 in order to implement ACPI functions. South bridge transceiver 360 stores the power management data in status bits and transmits these status bits to the MSIO 260 whenever the status values change. Similarly, power control status bits stored in RAM 304 of the MSIO 260 are transmitted to the South bridge 268 via the serial bus 262 whenever the MSIO status bits change. Status bits transmitted from the MSIO 260 to the South bridge 268 are listed and described in Table I, below. Refer to the Advanced Configuration and Power Interface Specification, Revision 1.0, published by Intel Corporation, Microsoft Corporation, and Toshiba Corporation, for more information on status bits denoted by "(ACPI)" in Table I.

TABLE I

Status bits transmitted from MSIO to the South bridge.

| | Name | Description |
|---|---|---|
| 1 | ACK | Used for acknowledging cycles between MSIO and South bridge. See FIG. 3, MSB Protocol, for details on this bit. |
| 2 | ISA Tristate | Used during powerdown modes to tristate or drive low the ISA bus output pins. Table II, below, lists exact pin values for powerdown.<br>1 - ISA tristate<br>0 - Normal ISA mode |
| 3 | Arbiter Mode | Request that the South bridge PCI arbiter be the main PCI arbiter.<br>1 - Request Arbiter master mode.<br>0 - Request Slave mode. |
| 4 | Sleep Request | Indicates that computer system should enter sleep mode.<br>1 - Assert sleep request.<br>0 - Negate sleep request. |
| 5 | IRQSER Idle Request | Requests that the serial IRQ bus be placed into idle or active mode.<br>1 - Request IRQSER idle mode.<br>2 - Request IRQSER active mode. |
| 6 | Arb Idle Request | Request to enable/disable the PCI arbiter<br>1 - Request to enable idle mode.<br>0 - Request to disable idle mode. |
| 7 | EC STS | Embedded Controller Status (ACPI). |
| 8 | USB STS | Universal Serial Bus Status (ACPI). |
| 9 | CPU Clock Status | CPU Clock Status (ACPI).<br>1 - CPU clock is not running.<br>0 - CPU clock is running. |
| 10 | RTC STS | Real Time Clock Status (ACPI). |
| 11 | WAK STS | Wake Status (ACPI). |
| 12 | PWRBTN STS | Power Button Status (ACPI). |
| 13 | General Purpose Status #2 | User defined (ACPI). |
| 14 | General Purpose Status #1 | User defined (ACPI). |
| 15 | RI STS | Ring Indicate Status (ACPI) |

TABLE I-continued

Status bits transmitted from MSIO to the South bridge.

| | Name | Description |
|---|---|---|
| 16 | DOCK STS | Dock Status (ACPI). |
| 17 | STSCHG STS | Status Change Status (ACPI). |
| 18 | LID STS | Lid Status (laptop computer lid) (ACPI) |
| 19 | GBL RLS CLR | Global Release Clear (ACPI)<br>1 - global release bit is cleared.<br>0 - global release bit is set. |
| 20 | General Purpose Status #4 | User defined (ACPI). |
| 21 | General Purpose Status #3 | User defined (ACPI). |
| 22 | ROM Address | Flash ROM page address. |

Table II lists the ISA bus pins which are affected by the ISA Tristate bit in Table I. According to the state of the ISA Tristate bit, certain ISA bus pins will be either driven low or tristated during sleep mode.

TABLE II

ISA bus pins affected by the ISA Tristate bit in Table I.

| | |
|---|---|
| Pins tristated | MWTC#, MRDC#, IOWC#, IORC#, ROM CS#, GPDACK6–GPDACK0, LOWMEMRD#, LOWMEMWR#, MB1DAK#, MB2DAK#, MB3DAK#, MB1 SEL#, MB2 SEL#, MB3 SEL#, MB1RST#, MB2RST#, MB3RST#, MB1 RD#, MB2 RD#, MB3 RD#, MB WR#, MB1CSEL, MB2CSEL, MB3CSEL, MB1 CS1#, MB2 CS1#, MB3 CS1#, MB1 CS3#, MB2 CS3#, MB3 CS3#, MB1DASP#, MBSDASP#, MB3DASP#, MB1PDIAG#, MB2PDIAG#, MB3PDIAG# |
| Pins driven low | SA19–SA00, TC, SSAEN0, MA AEN, MB ADDR2– MB ADDR0 |
| Pins unmodified | SERIRQ, SD15–0 |

Status bits transmitted from the South bridge 268 to the MSIO 260 are listed and described in Table III, below.

TABLE III

Status bits transmitted from the South bridge to the MSIO.

| | Name | Description |
|---|---|---|
| 1 | New MSB | Always set. Indicates improved MSB protocol. |
| 2 | GBL RLS | Reflects the value of the GBL RLS bit in the MSIO. Used to generate an SMI (interrupt). (ACPI) |
| 3 | CPU CLK Request | Requests MSIO to stop the CPU clock be enabled/disabled. (ACPI).<br>1 - Disable CPU clock.<br>0 - Enable CPU clock. |
| 4 | IDLE ACK STS | IDLE ACK pin status. Sent to MSIO to acknowledge sleep mode. |
| 5 | IRQSER Idle Status | Indicates whether IRQ is idle or active.<br>1 - All IRQ cycles are complete and the IRQSER pin is low.<br>0 - IRQSER is free for serial device access or is currently running a frame. |
| 6 | Arbiter Idle Status | Indicates whether the PCI Arbiter is in idle mode.<br>1 - PCI arbiter in idle mode.<br>0 - PCI arbiter in master/slave mode. |
| 7 | SLP EN | Sleep Enable (ACPI) |
| 8 | SLP TYP | Sleep Type (ACPI) |
| 9 | SCI EN | System Control Interrupt Enable (ACPI) |
| 10 | PWRBTN | Power Button (ACPI) |
| 11 | LID EN | Lid Enable (laptop computer lid) (ACPI) |
| 12 | EC EN | Embedded Controller Enable (ACPI) |
| 13 | USB EN | Universal Serial Bus Enable (ACPI) |
| 14 | RI EN | Ring Indicate Enable (ACPI) |
| 15 | RTC EN | Real Time Clock (ACPI) |

TABLE III-continued

Status bits transmitted from the South bridge to the MSIO.

| | Name | Description |
|---|---|---|
| 16 | STSCHG EN | Status Change Enable (ACPI) |
| 17 | DOCK EN | Dock Enable (ACPI) |

The status bits transmitted between the MSIO 260 and the South bridge 268 listed in Tables I and III represent only the preferred set of data. In general, the present invention is useful for transmitting any desired data.

The MSIO status bits listed in Table I preferably are initialized in the RAM 304 when the computer system is reset or during system startup ("boot"). The South bridge status bits, however, are each initialized to logic "0" during reset or boot. When the computer system initially starts up or is reset, the MSIO 260 preferably initiates the first data exchange. Although the MSIO 260 preferably initiates the first data exchange as soon as one of the status bits listed in Table I changes value, the MSIO 260 may alternatively initiate one or more data exchanges immediately after the computer initially boots or resets.

The South bridge transmit and receive registers 352 and 356 preferably are eight-bit shift registers which may be read from or written to in parallel by transceiver 360. The transmit register 352 shifts data onto the MSB 262 beginning with the least significant bit and ending with the most significant bit. The receive register 356 receives data in order from most to least significant bit. The transceiver 360 preferably writes data to the transmit register 352 in parallel via the write signals and reads data from the receive register 356 in parallel via the read signals. The transceiver 360 preferably initiates data transfers over the MSB 262 by asserting output pin 361. When not initiating a data transfer over the serial bus, however, transceiver 360 places output pin 361 into a tristate mode. Similarly, transceiver 360 asserts the enable 357 signal to allow transmit register 352 to control the serial bus 262. When not transmitting data, however, the transmit register 352 is placed into the tristate mode by deasserting the enable 357 signal.

By pulsing the S_Txclk signal, transceiver 360 causes the transmit register 352 to place one bit of data onto the serial bus 262 via the transmit data 353 signal. Hence, the entire eight-bit transmit register 352 is sent over the MSB 262 by pulsing S_txclk eight times while the enable 357 signal is asserted. Similarly, by pulsing the S_rxclk signal, the transceiver 360 causes the receive register 358 to accept one bit of data via the receive data 354 signal.

Finally, the South bridge transceiver 360 asserts the ISA Tristate signal to the ISA bus 240 to put the ISA bus 240 is in tristate mode. Further, the South bridge transceiver 360 asserts the arbiter idle signal to the PCI arbiter 344 in response to the "Arbiter Idle Status" bit listed in Table III.

Referring now to FIG. 3 and 4, the MSB Protocol of the preferred embodiment dictates how data is transmitted over the MSB 262. In FIG. 4, the MSBDATA signal represents the logic state of the MSIO serial bus (MSB) 262. The PCICLK signal, which preferably is used to synchronize the serial bus 262, is also illustrated in FIG. 4. Any device not driving the MSB 262 preferably remains in tristate mode, as described above with respect to FIG. 3. The serial bus 262, however, preferably is pulled to a logic "high" state via a weak pullup resistor 362 (preferably a high resistance) and thus remains in the logic "high" state when not in use. In order to more clearly illustrate the MSB Protocol, a tristate level in the timing diagram of FIG. 4 will indicate that no device is driving the MSB 262. The serial bus 262 never actually is tristated, however, due to the pullup resistor 362.

Before the beginning of data transmission over the serial bus 262, the output pins of all devices capable of driving the bus (transmit registers 312 and 352 and transceivers 320 and 360) are tristated (cycle 400). To request a data transfer, either MSIO transceiver 320 or South bridge transceiver 360 asserts a "start" signal by driving the serial bus 262 low (cycle 401) for one clock cycle. Alternatively, both MSIO transceiver 320 and South bridge transceiver 360 may simultaneously drive the bus 262 to assert the "start" signal. During the following cycle (cycle 402), all devices capable of driving the serial bus must be placed in a tristate mode. Next, the MSIO transmit register 312 transmits one bit of data during each of the next eight clock cycles (403 to 410). To capture each transmitted bit into South bridge receive register 356, the South bridge transceiver 360 pulses the S_rxclk signal once during each of cycles 403 to 410. In accordance with the preferred embodiment, the MSIO data is transferred to the South bridge 268 in cycles 403 through 410, no matter which device (MSIO or South bridge) asserted the "start" signal during cycle 401. During cycle 411, all devices capable of driving the serial bus 262 are placed into the tristate mode. Next, the South bridge transmit register 356 transmits one bit of data during each of the next eight clock cycles (412 to 419). To capture each transmitted bit into receive register 316, the MSIO transceiver 320 pulses the M_rxclk signal once during each of cycles 412 to 419. The South bridge data preferably is transferred to the MSIO in cycles 412 to 419, no matter which device (MSIO or South bridge) asserted the "start" signal during cycle 401. During cycle 420, the South bridge transceiver 360 preferably asserts MSBDATA to logic "high" to denote the end of the data transfer. In cycle 421, all devices capable of driving the MSB 262 are placed into tristate mode. Neither the MSIO or the South bridge may assert the "start" signal until one cycle after cycle 421. Thus, one complete data "exchange," in which each device sends the other device eight bits, takes 21 clock cycles, as illustrated in cycles 401–421 of FIG. 4. As one skilled in the art will recognize, alternative embodiments of the MSB Protocol may involve transmitting South bridge-to-MSIO data before MSIO-to-South bridge data.

For either device to transmit more than eight bits over the MSB 262, multiple data exchanges must occur. As shown in Tables I and III, for instances, each device in the present invention may transmit more than 20 different status bits.

Accordingly, FIG. 5 illustrates the timing diagram of a series of data exchanges between the MSIO 260 and South bridge 268 to facilitate data transfers of more than eight bits. In FIG. 5, the MSIO 260 and South bridge 268 each send only six bits of data during each eight-bit exchange. The remaining two bits sent by each device preferably serve as identifier (ID) bits to identify which status bits are represented by the six data bits. The resulting byte is referred to as a "frame," because it consists of a mixture of data and "frame ID" bits. Because two bits, preferably the two most significant bits of each frame, are reserved for the frame ID, up to four different frames may be transmitted by each device. Because each device can send up to four different frames, each frame having six bits of data, each device has the capability to transmit as many as 24 different status bits over the serial bus 262. Alternative embodiments may include any desired number of frame ID bits in the frames transmitted over the serial bus 262. For instance, using three frame ID bits would allow eight different frames having five data bits each, thereby permitting the transfer of 40 different status bits. In fact, it can be shown that transmitting eight-bit frames with either six or seven frame ID bits supports up to 128 different status variables.

Still referring to FIG. 5, "Exchange #1" illustrates one data exchange according to the MSB Protocol of FIG. 4. Note that because FIG. 5 is directed toward explaining the concept of exchanging data frames, the "start" signal and exact timing with respect to the PCICLK signal, as in FIG. 4, are neglected for simplicity. An actual series of data exchanges as in FIG. 5, however, is intended to follow the MSB Protocol of FIG. 4. The MSIO 260 transmits the first frame of Exchange #1, which includes bits 500 through 507. Because the MSIO 260 preferably transmits the data frame in order from least significant bit to most significant bit, the frame ID bits are the last two bits transmitted, bits 506 and 507. In the example of FIG. 5, the frame ID bits 507 and 506 are the binary numbers "0" and "1," respectively, representing the decimal number "1." Hence, bits 500 through 507 represent "MSIO Frame #1." Likewise, bits 505 through 501 represent the data bits of Frame #1, from most significant bit to least significant bit. When South bridge 268 receives Frame #1 from the MSIO 260, the frame ID bits identify which variables are represented by the frame ID bits.

Following bit 507, the South bridge 268, as required by the MSB Protocol, next sends one frame of data to the MSIO 260, represented by bits 508 through 515. Again the final two bits, bits 514 and 515, represent the frame ID. Bits 515 and 514 are both binary "0," representing Frame #0. Upon receiving a frame from the South bridge 268, the frame ID allows the MSIO 260 to determine the meaning of each of the data bits (bits 508 through 513).

Table IV below describes the content of each frame that the MSIO 260 may transmit to the South bridge 268 in accordance with the preferred embodiment. Note that the frame ID is listed in both binary and decimal notation in Table IV, as denoted by the subscripts "b" and "d," respectively. The acknowledge bit in Frame 0, bit 5, will be explained in greater detail following Table V, below. Detailed descriptions of the data bits listed in Table IV may be found in Table I, above.

TABLE IV

MSIO to South Bridge Frame definitions.

| Frame ID | Bit | Status Variable |
| --- | --- | --- |
| $00_b$ | 5 | ACK |
| $(0_d)$ | 4 | ISA Tristate |
|  | 3 | Arbiter Mode |
|  | 2 | Sleep Request |
|  | 1 | IRQSER Idle Request |
|  | 0 | Arb Idle Request |
| $01_b$ | 5 | EC STS |
| $(1_d)$ | 4 | USB STS |
|  | 3 | CPU Clock Status |
|  | 2 | RTC STS |
|  | 1 | WAK STS |
|  | 0 | PWRBTN STS |
| $10_b$ | 5 | General Purpose Status #2 |
| $(2_d)$ | 4 | General Purpose Status #1 |
|  | 3 | RI STS |
|  | 2 | DOCK STS |
|  | 1 | STSCHG STS |
|  | 0 | LID STS |
| $11_b$ | 5 | Unused |
| $(3_d)$ | 4 | Unused |
|  | 3 | GBL RLS Clear |

TABLE IV-continued

MSIO to South Bridge Frame definitions.

| Frame ID | Bit | Status Variable |
|---|---|---|
| | 2 | General Purpose Status #4 |
| | 1 | General Purpose Status #3 |
| | 0 | ROM Address |

Table V below describes the content of the frames the South bridge 268 may send to the MSIO 260. Note that the frame ID is expressed in both binary and decimal notation in Table V, as denoted by the subscripts "b" and "d," respectively. Detailed descriptions of the data bits listed in Table V may be found in III above.

TABLE V

South Bridge to MSIO Frame definitions.

| Frame ID | Bit | Status Variable |
|---|---|---|
| $00_b$ | 5 | New MSB |
| $(0_d)$ | 4 | GBL RLS |
| | 3 | CPU CLK Request |
| | 2 | IDLE ACK STS |
| | 1 | IRQSER Idle Status |
| | 0 | Arbiter Idle Status |
| $01_b$ | 5 | Unused |
| $(1_d)$ | 4 | SLP EN |
| | 3 | SLP TYP |
| | 2 | SLP TYP |
| | 1 | SLP TYP |
| | 0 | SCI EN |
| $10_b$ | 5 | PWRBTN EN |
| $(2_d)$ | 4 | LID EN |
| | 3 | EC EN |
| | 2 | USB EN |
| | 1 | RI EN |
| | 0 | RTC EN |
| $11_b$ | 5 | General Purpose Enable #4 |
| $(3_d)$ | 4 | General Purpose Enable #3 |
| | 3 | General Purpose Enable #2 |
| | 2 | General Purpose Status #1 |
| | 1 | STSCHG EN |
| | 0 | DOCK EN |

Referring again to FIG. 3 the direct connection between the South bridge transceiver 360 and the South Bridge receive register 356 allows the South bridge transceiver 360 to read and record the receive register contents immediately after receiving a data frame from the MSIO 260. To read the MSIO receive register 316, however, the embedded controller 308 preferably executes a data read cycle via the ADDRESS and DATA lines in FIG. 3, a possibly time-consuming process. To prevent the South bridge 268 from overwriting data in the MSIO receive register 316 before the embedded controller 308 has an opportunity to read the data previously written into the receive register 316, the MSIO 260 preferably transmits an acknowledge bit to the South Bridge 268 to indicate that the most recent data frame has been read by embedded controller 308 from the receive register 316. Accordingly, bit#5 of Frame 0 (in Table IV, above) represent the acknowledge bit is initially set to logic "0" when the computer system first powers on. Thereafter, to acknowledge receipt of a South bridge frame, the MSIO 260 toggles the value of the acknowledge bit (i.e., changes the acknowledge bit from a logic "0" to a logic "1" or from a logic "1" to logic "0") and transmits Frame 0 to the South bridge 268. The South bridge transceiver 360 tracks the current value of the acknowledge bit. Thus, if the South bridge 268 transmits new data to the MSIO 260 during a particular data exchange, then no new data may be sent to the MSIO 260 during subsequent exchanges unless the MSIO 260 returns a Frame 0 with the acknowledge bit toggled to the opposite logic state from its current state. In addition, the South bridge may not initiate any data exchanges (by asserting the "start" signal) until the MSIO 260 returns a toggled acknowledge bit to the South bridge 268. If a data exchange occurs between the MSIO 260 and South bridge 268, but the MSIO 260 does not indicate receipt of the previous MSIO-to-South bridge frame, then the South bridge 268 preferably re-transmits the last frame that was transmitted to the MSIO 260. To ensure data coherency, the re-transmitted frame includes the same data that was previously transmitted, even if the South bridge data has changed since the previous data exchange.

Returning to FIG. 5, assume for purposes of example that the South bridge-to-MSIO frame of Exchange #1 (Frame 0), included new values for data bits 508 through 513 and that the current value of the acknowledge bit is a logic "0." Between the end of data Exchange #1 and the beginning of Exchange #2, the embedded controller 308 preferably reads the new data from the MSIO receive register 316 and toggles the acknowledge bit to logic "1." The MSIO transceiver 320 then initiates a new data exchange (Exchange #2) and transmits MSIO Frame 0 to the South bridge 268. Bits 516 to 523 represent the new data frame sent to the South bridge 268. Bits 523 and 522 represent the frame ID "0," and bit 521 (which is bit 5 in the frame) holds the acknowledge bit, which is now set to logic "1."

Immediately after receiving Frame 0 from the MSIO 260 with a toggled acknowledge bit, the South bridge 268 sends new data to the MSIO receive register 316. Accordingly, the South bridge 268 transmits Frame 2 (bits 524 through 531) to the MSIO 260. If the acknowledge bit (bit 521) in Frame 0 of Exchange #2 had been a logic "0" in this example, the South bridge 268 would have been required to re-transmit Frame 0, with the same data as in Exchange #1.

Referring still to the example of FIG. 5, because the MSIO 260 receives new data during Exchange #2, the MSIO 260 preferably acknowledges the new data to permit South bridge 268 to transmit new data or initiate another data exchange. In the example of FIG. 5, however, the MSIO 260 initiates a new data exchange (Exchange 3) to transmit Frame 3 to the South bridge 268. Adhering to the MSB Protocol, the South bridge 268 returns a data frame to the MSIO 260 (bits 540 through 547). Because the previous frame transmitted by the South bridge 268 Frame 2 of Exchange #2) is not acknowledged by the MSIO 260 during Exchange #3, the South bridge 268 must transmit the same data in Exchange #3 that was transmitted in Exchange #2. Thus, bits 540 through 547 exactly mirror bits 524 through 531.

Following Exchange #3, the MSIO initiates Exchange #4 by asserting the "start" signal (not shown). During Exchange #4, the MSIO transmits Frame 0 (bits 548 through 555) with the acknowledge bit set to logic "0" (bit 553). Because the previous acknowledge bit was set to logic "1," the current frame indicates that the embedded controller 308 has read the previous South bridge frame (Frame 2 from Exchange #2) and that the South bridge 268 may transmit a new data frame during Exchange #4. Accordingly, the South bridge 268 transmits Frame 1 (bits 556 through 563) to complete Exchange #4. Note, however, that the South bridge 268 is not required to send a new data frame in response to a toggled "ACK" bit if there is no new data to send. In such a situation, the South bridge 268 preferably re-transmits the previous frame.

In alternative embodiments, the MSIO 262 and South bridge 268 may operate according to other exchange protocols. Under one such protocol, the South bridge 268 always transmits the first byte of a data exchange. Under another protocol, the MSIO and South bridge take turns transmitting the first byte, as regulated by a predetermined arbitration scheme.

Figure 6A:
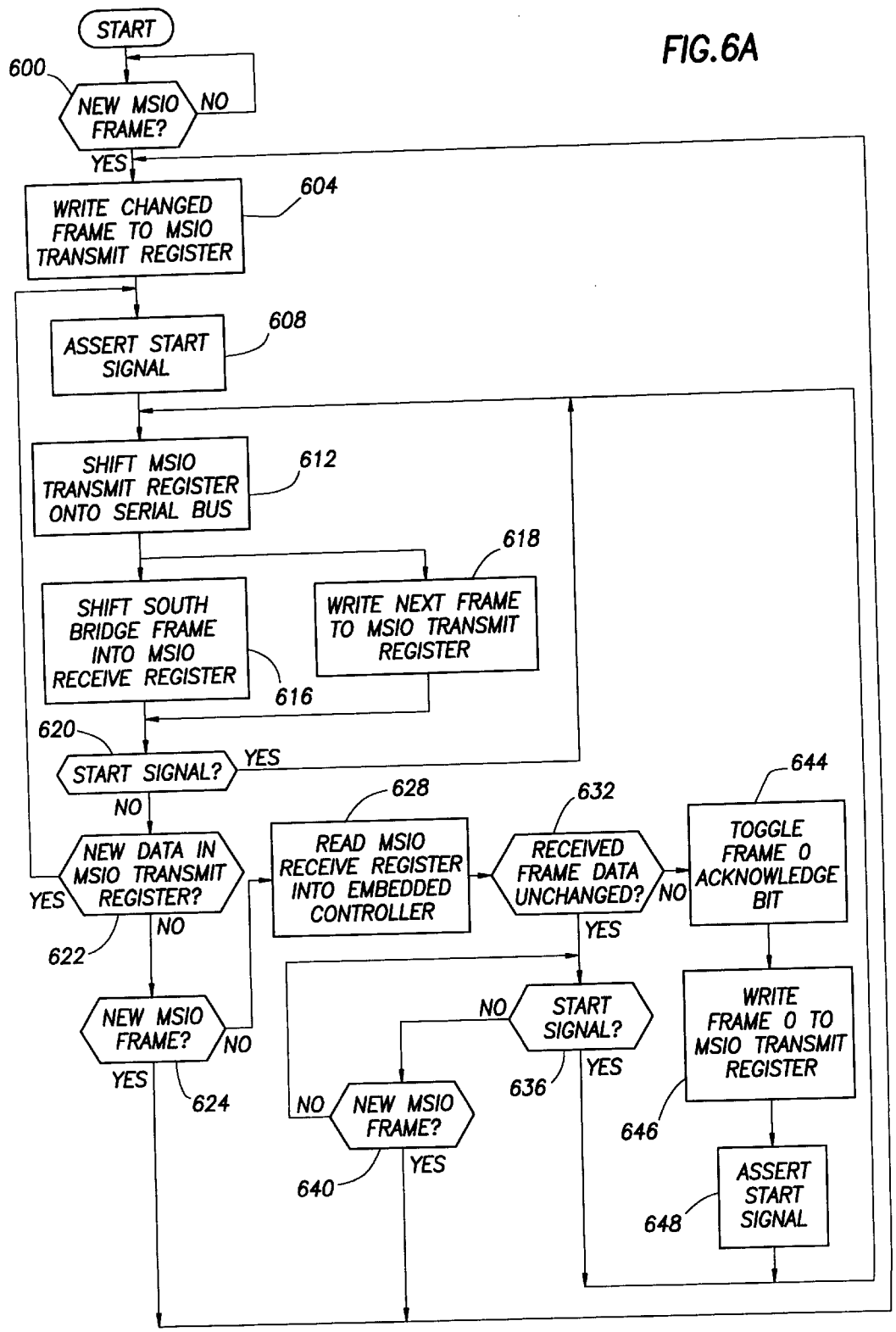
FIG. 6A is an exemplary flowchart illustrating the use of the serial bus by the I/O controller of FIG. 3.

FIG. 6A provides an exemplary flowchart illustrating the steps taken by the MSIO 260 to exchange data frames with the South bridge 268. FIG. 6A is described with reference to FIGS. 3 and 4. It is assumed in FIG. 6A that the computer system has completed a boot sequence and has initialized all of the MSIO status bits (from Table I) to the default values. Beginning with the "start" block, program flows proceeds to decision block 600, in which the MSIO 260, and specifically the embedded controller 308, decides whether any of the status bits have changed from the default values. If none of the status bits has changed value, the program remains in step 600. When a status bit changes, program flow branches to step 604, in which the frame with the changed status bits is written to the MSIO transmit register 312. Next proceeding to block 608, the MSIO transceiver 320 asserts the "start" signal by driving the serial bus 262 low. Although not illustrated specifically in FIG. 6A, the South bridge transceiver 360 detects the "start" signal and prepares to receive a data frame from the MSIO 260.

Next, in step 612 the MSIO transmit register 312 is shifted sequentially onto the MSB 262 and into the South bridge receive register 356, beginning with the least significant bit and ending with the most significant bit. Program flow next branches to steps 616 and 618, which preferably are executed simultaneously. In step 618, the embedded controller 308 writes a new data frame to the MSIO 312 transmit register to prepare for the next data exchange. If a status bit has changed that is not reflected in the frame transmitted during the previous step 612, then that changed frame is written to the transmit register in step 618. If all status bit chances have been transmitted to the South bridge 268, however, then the previous frame is loaded into the transmit register in step 618. At the same time, in step 616, the MSIO transceiver 320 pulses M_rxclk to receive the incoming the South bridge 268 frame. Step 616 completes the current data exchange.

In decision step 620, which follows steps 616 and 618, the MSIO transceiver 320 monitors the logic state of the MSB 262 to detect a "start" signal from the South bridge 268. Note, however, that the South bridge will not assert a "start" signal if the frame transmitted by the South bridge 268 in step 616 contains new data. If the MSB 262 is low in step 620, indicating that the South bridge 268 is initiating a data transfer, then the program branches to step 612 to begin the next data exchange.

If the serial bus 262 is not driven low in step 620 (i.e., by the South bridge), then the program moves to decision block 622. If the frame currently held in the MSIO transmit register 312 contains new data that has not been transmitted to the South bridge 268, then the program returns to block 608 to initiate another data exchange. If the transmit register 312 contains data already transmitted to the South bridge, however, then the program branches to decision block 624.

Decision block 624 directs program flow according to whether or not any status bits have changed, perhaps between steps 612 and 622, but have not been transmitted to the South bridge 268. If any MSIO-to-South bridge frames have changed status bits, then control returns to block 604 to prepare to transmit the changed data frame. If all of the MSIO-to-South bridge status bits are updated, however, then control moves to step 628.

In step 628, the embedded controller 308 reads the contents of the MSIO receive register 316. In step 628, the receive register 316 contains the frame of data transmitted by the South bridge 268 during step 616. In the following step 632, the embedded controller 308 determines if the frame received in step 616 contains updated status bits (note that it is possible for the South bridge 268 to transmit the same data repeatedly). If the data in the received frame is different from when that same frame was transmitted previously, then the embedded controller 308 prepares a new Frame 0 in step 644 to transmit to the South bridge 268. Because the frame received in step 616 contains new data, the embedded controller 308 toggles the acknowledge bit in step 644. As described above, if the acknowledge bit is a logic "1," then the embedded controller 308 changes the acknowledge bit to a logic "0." Conversely, if the acknowledge bit is a logic "0," then the embedded controller 308 changes the acknowledge bit to a logic "1."

Next moving to step 646, the embedded controller 308 writes Frame 0 to the MSIO transmit register 312. Control then moves to step 648, in which the MSIO transceiver 320 asserts a "start" signal by driving the serial bus 626 low. The next data exchange, which includes a toggled acknowledge bit, then commences in step 612. Note that the toggled acknowledge bit enables the South bridge 268 to return another new frame during the next step, step 616.

If, during step 632 none of the variables in the frame received from the South bridge 268 have been updated, then control moves to step 636. Because none of the South bridge-to-MSIO variables were updated during the previous data exchange, the South bridge 268 is free to initiate another data exchange. Accordingly, the control branches to step 612 to begin a new data exchange if the South bridge 268 drives the serial bus 262 low in step 636. If the serial bus is not asserted low in step 636, then the program moves to decision block 640. If a status bit has changed since the previous data exchange, then the program returns to block 604, in which the frame that holds the changed status bit(s) is loaded into the MSIO transmit register 312. If the MSIO 260 has transmitted all of the current status bit values to the South bridge 268, however, then program flow returns to step 636. The program toggles between steps 636 and 640 as long as the South bridge 268 does not assert the "start" signal and as long as none of the MSIO-to-South bridge status bits change.

Figure 1:
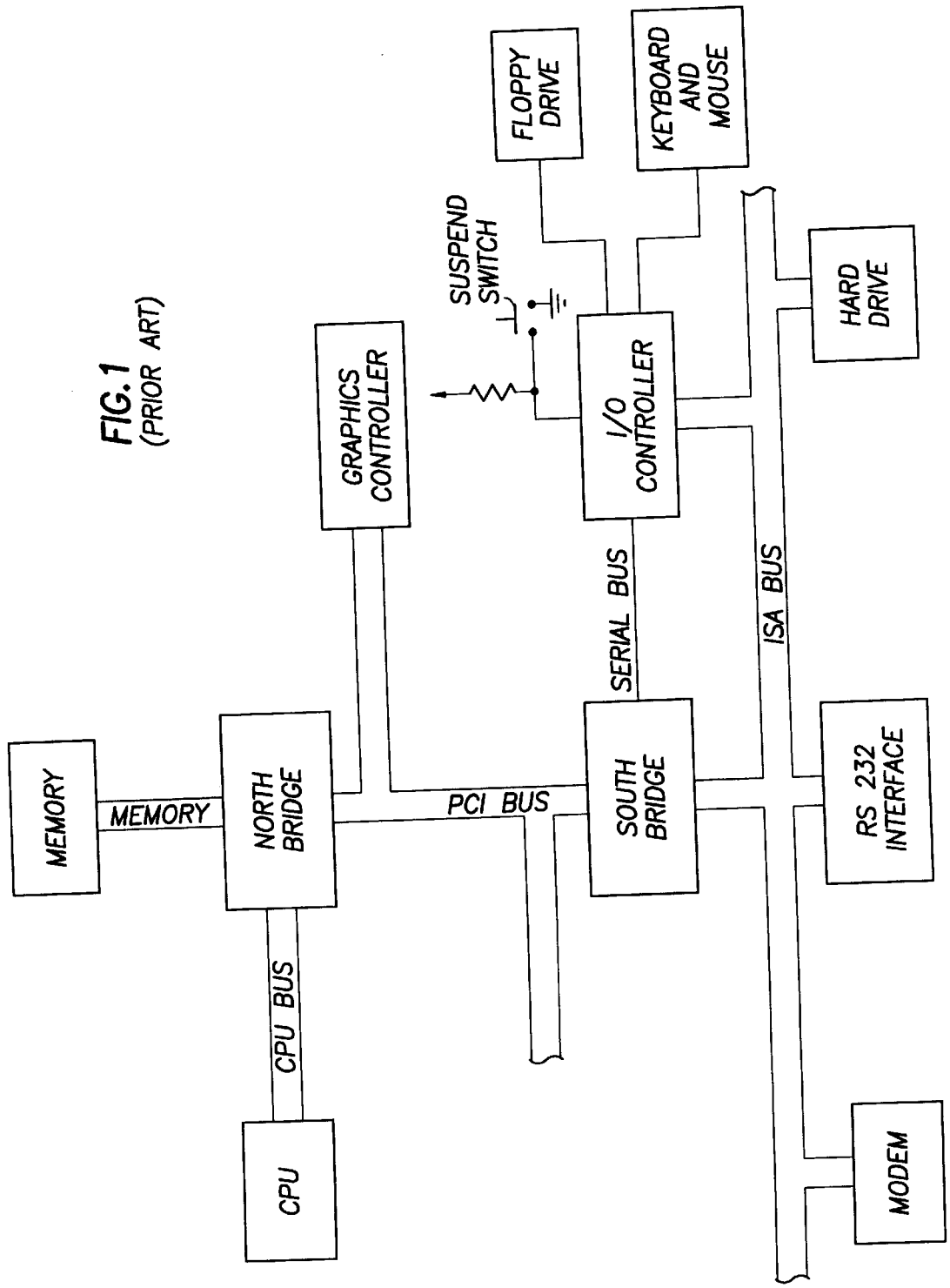
FIG. 1 is a block diagram of a prior art computer system implementing a bridge logic to couple together dissimilar buses.

FIGS. 6B1 and 6B2 are an exemplary flowchart illustrating the steps taken by the South bridge 268 to exchange data frames with the MSIO 260. It is assumed in FIG. 6B that the computer system has completed a boot sequence and has initialized all of the South bridge status bits (from Table III) to logic "0." Beginning with the "start" block, control proceeds to decision block 650, which branches if one of the South bridge status bits changes from logic "0" to logic "1." If all South bridge status bits are unchanged, then the program moves to decision block 652. From block 652, program flow branches back to block 650 if the South bridge transceiver 360 does not detect a "start" signal from the MSB 262. If the South bridge transceiver 360 detects a "start" signal in block 652, however, program flow branches to blocks 658 and 664, which are executed in parallel.

Again examining block 650, if the data of any South bridge status frame changes, then program flow moves to block 654, in which the frame containing the changed bits is written to the South bridge transmit register 352. If more than one South bridge frame contains updated status bits, then the South bridge 268 preferably writes the frame having the lowest frame number to the transmit register 352. In other words, Frame 0 has the highest priority, followed by Frame 1 and then by Frame 2. South bridge Frame 3 has the lowest priority to be written to the transmit register 352 in block 654. In alternative embodiments, the priority between frames may follow any desired arbitration scheme. From block 654, the program moves to block 656, which branches to block 664 as soon as the South bridge transceiver detects a "start" signal on the serial bus 262. Note that the MSIO preferably initiates the first data exchange. Although the South bridge transmit register 352 holds new data to send to the MSIO 260, the program preferably remains in block 656 until the MSIO 262 asserts the "start" signal.

In block 664, the South bridge transceiver 360 pulses the S_rxclk signal to shift data from the MSIO 260 into the South bridge receive register 356. If the program was previously in block 652, then blocks 656, 660, and 662 are executed simultaneously with block 664. Following block 664, the program continues to block 668.

Blocks 658, 660, and 662 allow the South bridge to transmit a data frame in which a South bridge status bit is updated while the MSIO 260 is transferring data to the South bridge. If the South bridge status bit is updated before the MSIO 260 transmits the final bit of the MSIO-to-South bridge frame, then the South bridge frame containing the changed bit is placed immediately into the South bridge transmit register 352 to be transmitted to the MSIO 260. If any South bridge status bit changes after the MSIO transmission is complete, however, then the frame containing the changed status bit must be transferred during a subsequent cycle. Accordingly, in block 658, the program branches to block 660 if any South bridge status bit data changes during the data exchange. Otherwise, the program continues to block 668 after the MSIO data is received in block 664. From block 660, the program branches to block 662 if the changed status bit changes value before the final bit of the MSIO transmission is complete. Otherwise, the program proceeds to block 668 when the MSIO completes the data transfer in block 664.

In block 662, the frame containing the changed bit is written to the South bridge transmit register 352 to be transmitted during the current data exchange. If the status bits in more than one South bridge frame change before the final bit (bit 7) of the MSIO data is received, then the changed South bridge frame having the lowest frame number will be placed into the transmit register in step 662. In other words, Frame 0 has the highest priority, followed by Frame 1 and then by Frame 2. South bridge Frame 3 has the lowest priority to be written to the transmit register 352 in block 662. In alternative embodiments, the South bridge chooses which frame to transmit according to any desired arbitration scheme. Referring again to the MSB Protocol of FIG. 4, note that because the MSIO 260 has just transmitted one frame, the South bridge 268 is allowed one clock cycle (corresponding to cycle 411 of FIG. 4) to write data into the South bridge transmit register 352. From block 662, the program moves to block 668 when the final MSIO status bit is transferred into the South bridge receive register 356 in step 664.

Beginning at block 668, the South bridge 268 has just received one data frame from the MSIO 260 (block 664). The South bridge 268 therefore shifts the South bridge transmit register 352 onto the serial bus 262 during block 668. Moving next to block 669, if the South bridge to MSIO data in block 668 was new, then the program flow will continue to 670. In step 670, the program branches according to whether or not the "start" signal appears on the serial bus 262 following the South bridge-to-MSIO transfer in block 668. Because MSIO 260 must acknowledge the data frame transmitted to the MSIO 260 during block 668 before the South bridge 268 can initiate another data exchange, the South bridge returns to decision block 670 if the MSIO 260 does not assert "start" signal on the MSB 262. As soon as the MSIO 260 asserts the "start" signal to initiate another data exchange, the program moves to block 672. Block 670 also represents the starting point for subsequent data exchange cycles. Accordingly, the program flow may merge into block 670 from block 694, as discussed below.

In Block 669 program flow will go to Block 684 if the first South bridge-to-MSIO transfer (block 668) did not include changed data. Block 684 is described in greater detail below.

Block 672 represents the MSIO-to-South bridge data transfer, during which the South bridge transceiver 360 pulses the S_rxclk signal to shift the MSIO frame into the South bridge receive register 356. Block 674 follows block 672, in which the South bridge transceiver 360 determines whether the MSIO frame received in block 672 contains a toggled acknowledge bit. The received frame contains a toggled acknowledge bit if the frame ID (the last two bits transmitted) are both logical "0" (representing MSIO Frame 0) and if bit #5 (the 6th bit transmitted) is toggled from the previous value. Because the acknowledge bit is initialized to logic "0" when the MSIO is reset or when the computer boots, the previous value of the acknowledge bit will be a logic "0" if the current data exchange is the second data exchange to occur. In that case, a toggled acknowledge bit is represented by a logic "1" if the frame ID is binary "00."

If MSIO frame received in block 672 does not have a toggled acknowledge bit, then the program continues to block 676. Because the MSIO 260 did not acknowledge the previous South bridge transmitted frame, the South bridge 268 may not send new data during the current data exchange. Hence, the South bridge 268 preferably loads the previously transmitted frame, containing the previously transmitted status bit values, into the South bridge transmit register 352. Referring again to the MSB Protocol of FIG. 4, note that because the MSIO 260 has just transmitted one frame, the South bridge 268 has one clock cycle (corresponding to cycle 411 of FIG. 4) to write data into the transmit register 352.

Moving next to block 694, the South bridge transceiver 260 pulses the S_txclk signal to shift the transmit register contents onto the serial bus 262. Because the previous MSIO-to-South bridge frame did not contain a toggled acknowledge bit, the South bridge 268 may not initiate another data exchange. Hence, program flow next moves to block 670, in which the South bridge transceiver 360 remains until the MSIO 260 asserts the "start" signal.

If the previous frame did contain a toggled acknowledge bit during block 674, then program flow branches from block 674 to block 678. Prior to block 678, the transceiver 360 may not have transmitted all updated status bits to the MSIO 260. If there are updated status bits that have not been transmitted to the MSIO 260, then program flow moves to block 692, in which the frame containing updated status bit(s) is written to the South bridge transmit register 352 to be sent to the MSIO 260. If more than one South bridge frame has updated status bits to be transmitted to the MSIO 260, then the South bridge 268 preferably selects a frame to transmit according to a round robin arbitration scheme, although the South bridge may use any desired arbitration scheme to select the transmitted frame. Next, the transceiver 360 pulses the S_txclk signal to shift the transmit register contents onto the serial bus 262 during block 694 and continues to block 670 to await the next "start" signal.

If all of the current status bit values have been transmitted to the MSIO 260 prior to block 678, then the South bridge 268 continues to block 680 and writes the previously transmitted frame into the transmit register 352. Referring again to the MSB Protocol of FIG. 4, note that because the MSIO 260 has just transmitted one frame, the South bridge 268 is allowed one clock cycle (corresponding to cycle 411 of FIG. 4) to write data into the transmit register 352. Also note that the South bridge 268 may write any desired frame to the transmit register 352 during block 680 without departing from the principles of the present invention.

Next moving to block 682, the South bridge transceiver 360 pulses the S_txclk signal to shift the transmit register onto the serial bus 262 and continues to block 684. Prior to block 684, the MSIO 260 has acknowledged the most recent updated data frame sent by the South bridge 268. Hence, either the South bridge 268 or the MSIO 260 may initiate the next data exchange. If the South bridge 268 detects a "start" signal on the serial bus 262 during block 684, then the program moves to block 685 to begin a new data exchange. In block 685, the South bridge transceiver 360 shifts an MSIO frame into the South bridge receive register 356. Control next moves to block 678 and proceeds as described previously.

If no start signal is detected during block 684, then the program moves to decision block 686, which branches the program back to block 684 if none of the South bridge status bits have been updated. Hence, as long as the MSIO 260 does not initiate a "start" signal and as long as none of the status bits in the South bridge change, the program alternates between blocks 684 and 686. If one or more South bridge status bits change, however, the program moves from block 686 to block 688, in which the South bridge transceiver 360 asserts a "start" signal on the MSB 262. Continuing next to block 690, the data exchange commences, and the transceiver 360 pulses the S_rxclk signal to shift the MSIO status frame into the South bridge receive register 356. Next moving to block 692, the frame containing the updated status bits is written to the South bridge transmit register 352 and then transmitted to the MSIO 260 during block 694. If more than one South bridge frame contains updated status bits during block 692, then the South bridge transceiver 360 preferably uses a round robin arbitration scheme to choose the transmitted frame. Note, however, that the South bridge transceiver 360 may use any desired arbitration scheme without departing from the principles of the present invention.

Hence, the present invention discloses an apparatus and method that overcome the difficulties of upgrading the previous serial bus scheme to introduce more powerful functionality. In particular, the present invention allows up to 24 different status bits to be transmitted over a serial bus that previously accommodated only eight, without sacrificing backward compatibility. Numerous variations and modifications will become apparent to those skilled in the art once the above disclosure is fully appreciated. It is intended that the following claims be interpreted to embrace all such variations and modifications.

What is claimed:

1. A computer system comprising:
   a processor that executes program instructions;
   a memory device coupled to said processor that stores data and program instructions;
   a bridge logic device coupled to said processor via an expansion bus, said bridge logic device comprising an expansion bus interface that executes bus cycles over said expansion bus and a bridge logic serial bus interface coupled to said expansion bus interface;
   an input/output controller coupled to said bridge logic device over a serial bus, said input/output controller comprising an embedded controller that executes firmware instructions and an I/O serial bus interface coupled to said embedded controller; and
   wherein said bridge logic device and said input/output controller transmit data
   frames over said serial bus, each data frame comprising a frame ID and a data field.

2. A computer system as in claim 1 wherein the frame ID identifies the contents of the data field.

3. A computer system as in claim 1 wherein one of the data fields includes an acknowledge bit and wherein the value of the acknowledge bit indicates whether said input/output controller has received a data frame transmitted by said bridge logic device.

4. A computer system as in claim 3 wherein said input/output controller toggles the acknowledge bit to indicate that a data frame has been received from said bridge logic device.

5. A computer system as in claim 3 wherein said bridge logic device retransmits a previously transmitted data frame if the value of the acknowledge bit indicates that said input/output controller has not received said previously transmitted data frame from said bridge logic device.

6. A computer system as in claim 1 wherein said bridge logic serial bus interface includes a receive register coupled to said serial bus, said receive register capable of receiving a data frame from said serial bus, and a transceiver coupled to said serial bus and to said receive register, said transceiver capable of reading the contents of said receive register.

7. A computer as in claim 6 wherein said bridge logic serial bus interface further includes a transmit register coupled to said serial bus and to said transceiver and wherein said transceiver is adapted to load a data frame into said transmit register and to transmit the contents of said transmit register over said serial bus.

8. A computer system as in claim 7 wherein said bridge logic serial bus interface reads a data frame from said receive register, determines an appropriate data frame to transmit to said input/output controller based on said data frame from said receive register, places said appropriate data frame into said transmit register, and transmits the contents of said transmit register over said serial bus.

9. A computer system as in claim 8 wherein said transceiver chooses said appropriate data frame based on the frame ID and at least one bit of the data field belonging to said data frame from said receive register.

10. A computer system as in claim 1 wherein one of the data frames includes a status bit that represents whether said input/output controller received a previous data frame from said bridge logic device.

11. A computer system as in claim 1 including a first data frame having a first status bit, and wherein said bridge logic device transmits the first data frame if the value of the first status bit changes.

12. A computer system as in claim 11 further including a second data frame having a second status bit, and wherein if the values of the first and second status bits change, then said bridge logic device uses a round robin arbitration scheme to choose between transmitting the first data frame and transmitting the second data frame.

13. A computer system as in claim 1 wherein one of the data fields includes a status bit and wherein said input/output controller transmits said one of the data fields if the value of the status bit changes.

14. A bridge logic unit, comprising:

a transmit register coupled to a serial bus;

a receive register coupled to said serial bus; and a transceiver coupled to said serial bus, said transmit register, and said receive register, said transceiver capable of transmitting data frames over said serial bus from said transmit register and receiving data frames from said serial bus into said receive register, each data frame comprising at least one ID bit identifying the data content of that data frame.

15. A bridge logic unit as in claim 14 wherein said transmit register comprises a shift register and wherein said transmit register transmits a bit to said serial bus if said transceiver asserts a clock signal to said transmit register.

16. A bridge logic unit as in claim 14 wherein said receive register comprises a shift register and wherein said receive register receives a bit from said serial bus if said transceiver asserts a clock signal to said receive register.

17. A bridge logic unit as in claim 14 wherein said transceiver is adapted to read a data frame from said receive register, select an appropriate data frame to transmit based on said data frame from said receive register, and load said appropriate data frame into said transmit register.

18. A bridge logic unit as in claim 17 wherein said data frame from said receive register includes two ID bits and wherein said transceiver selects said appropriate data frame based on the two ID bits.

19. A bridge logic unit as in claim 17 wherein said data frame from said receive register includes a status bit and wherein said transceiver selects said appropriate data frame based on the status bit.

20. A method of exchanging data frames between a first device and a second device via a computer bus, comprising:

(a) asserting a start signal to initiate a data exchange;

(b) transmitting a first data frame from said first device to said second device, the first data frame including a first frame ID and a first data field;

(c) receiving the first data frame into said second device;

(d) transmitting a second data frame from said second device to said first device, wherein the second data frame includes a second frame ID and a second data field, and wherein the second data frame is selected based on the contents of the first data frame;

(e) receiving the second data frame into said first device.

21. A method as in claim 20 wherein step (b) further includes:

(b1) examining a plurality of data fields to determine whether any of the data fields are changed from a previous value;

(b2) choosing the first data field as one of the updated data fields if at least one data field is changed;

(b3) choosing a previously transmitted data field as the first data field if none of the data fields are changed;

(b4) determining the first frame ID as the frame ID corresponding to the first data field;

(b5) placing the first frame ID and the first data field into a transmit register (b6) placing said transmit register contents onto said bus.

22. A method as in claim 20 wherein step (c) further includes:

(c1) reading the first frame ID and the first data field into a receive register from said bus;

(c2) placing the contents of said receive register into a control logic device;

(c3) using said control logic device to determine if the value of the first frame ID matches a predetermined value;

(c4) determining the value of a status bit if the frame ID matches said predetermined value; and (c5) storing the contents of said receive register into a memory device.

23. A method as in claim 20 wherein step (d) further includes:

(d1) examining a plurality of data fields to determine whether any of the data fields are changed from a previous value;

(d2) determining whether the value of an acknowledge variable is TRUE or FALSE;

(d3) choosing the second data field as one of the changed data fields if at least one data fields is changed and if the acknowledge variable is TRUE;

(d4) choosing a previously transmitted data field as the second data field if none of the data fields is changed;

(d5) choosing a previously transmitted data field as the second data field if the acknowledge variable is FALSE;

(d6) determining the second frame ID as the frame ID corresponding to the second data field;

(d7) placing the second frame ID and the second data field into a transmit register (d8) placing said transmit register contents onto said bus.

24. A method as in claim 20 wherein step (e) further includes:

(e1) reading the second frame ID and the second data field into a receive register from said bus;

(e2) placing the contents of said receive register into a controller device; and (e3) storing the contents of said receive register into a memory device.

25. A method as in claim 20 wherein said second device asserts the start signal after steps (a) through (e) to initiate a new data exchange only if the first data field includes an acknowledge bit.

26. A method as in claim 20 further including:

(f) asserting an end signal to terminate the data exchange.

27. A method as in claim 20 wherein the frame ID comprises two bits.

28. A method as in claim 20 wherein the frame ID defines the meanings of the elements of the data field.

29. A method as in claim 20 further including:

(f) transmitting an acknowledge bit from the first device to the second device to indicate that a previous data frame was received;

(g) transmitting an updated data frame from the second device to the first device only if the first data frame includes the acknowledge bit.

30. A method as in claim 29 wherein step (f) further includes toggling the current value of the acknowledge bit to indicate that a previous data frame was received.

* * * * *